United States Patent [19]
Lesher et al.

[11] 3,857,851
[45] Dec. 31, 1974

[54] 1,4-DIHYDRO-4-OXO-1,8-NAPHTHYRIDINE-3-CARBOXALDEHYDES

[75] Inventors: George Y. Lesher, Schodack; Monte D. Gruett, East Greenbush, both of N.Y.

[73] Assignee: Sterling Drug Inc., New York, N.Y.

[22] Filed: Mar. 22, 1974

[21] Appl. No.: 453,929

Related U.S. Application Data

[62] Division of Ser. No. 338,613, March 6, 1973.

[52] U.S. Cl. ... 260/295 N, 260/295.5 B, 260/296 N, 424/266
[51] Int. Cl. ............................................. C07d 31/36
[58] Field of Search ..................... 260/296 N, 295 N

[56] References Cited
OTHER PUBLICATIONS

Baumgarten et al., Chem. Abstracts, Vol. 51, (19), 14,721g–14,922b, Oct. 10, 1957.

*Primary Examiner*—Alan L. Rotman
*Attorney, Agent, or Firm*—Robert K. Bair; B. Woodrow Wyatt

[57] ABSTRACT

Process of reacting 1,4-dihydro-4-oxo-7-Q-1,8-naphthyridine (I) with a formylating agent to produce 1,4-dihydro-4-oxo-7-Q-1,8-naphthyridine-3-carboxaldehyde II, reacting II with a lower-alkylating agent to produce 1-(lower-alkyl)-1,4-dihydro-4-oxo-7-Q-1,8-naphthyridine-3-carboxaldehyde (III), and oxidizing III to produce 1-(lower-alkyl)-1,4-dihydro-4-oxo-7-Q-1,8-naphthyridine-3-carboxylic acid (IV), where Q is lower-alkyl, lower-alkanoyloxymethyl, 4(or 3)-pyridyl or 4(or 3)-pyridyl having one or two lower-alkyl substituents. The final products (IV) are known antibacterial agents, as are the corresponding 7-hydroxymethyl compounds which are prepared by hydrolysis of the final products where Q is 7-(lower-alkanoyloxymethyl).

4 Claims, No Drawings

1,4-DIHYDRO-4-OXO-1,8-NAPHTHYRIDINE-3-CARBOXALDEHYDES

This application is a division of copending application Ser. No. 338,613, filed Mar. 6, 1973.

This invention relates to steps in the process of preparing 1,8-naphthyridine-3-carboxylic acids and to compositions used therein.

The invention in a process aspect comprises the combination of the three steps of reacting 1,4-dihydro-4-oxo-7-Q-1,8-naphthyridine (I), which is tautomeric with 4-hydroxy-7-Q-1,8-naphthyridine (IA), with a formylating agent to produce 1,4-dihydro-4-oxo-7-Q-1,8-naphthyridine-3-carboxaldehyde (II), which is tautomeric with 4-hydroxy-7-Q-1,8-naphthyridine-3-carboxaldehyde (IIA), reacting II (or IIA) with a lower-alkylating agent to produce 1-(lower-alkyl)-1,4-dihydro-4-oxo-7-Q-1,8-naphthyridine-3-carboxaldehyde (III), and reacting III with an oxidizing agent capable of converting -CHO to -COOH to produce 1-(lower-alkyl)-1,4-dihydro-4-oxo-7-Q-1,8-naphthyridine-3-carboxylic acid (IV), where Q is lower-alkyl, lower-alkanoyloxymethyl, 4(or 3)-pyridyl or 4(or 3)-pyridyl having one or two lower-alkyl substituents. The final products (IV) are known antibacterial agents, as are the corresponding 7-hydroxymethyl compounds which are prepared by hydrolysis of the final products where Q is lower-alkanoyloxymethyl. In addition to said combination of the three steps, other process aspects of the invention are each individual step and the two consecutive combinations of two steps.

The invention in its composition aspect resides in the compounds: 1,4-dihydro-4-oxo-7-Q-1,8-naphthyridine-3-carboxaldehyde and its tautomeric 4-hydroxy-7-Q-1,8-naphthyridine-3-carboxaldehyde of the respective formulas II and IIA

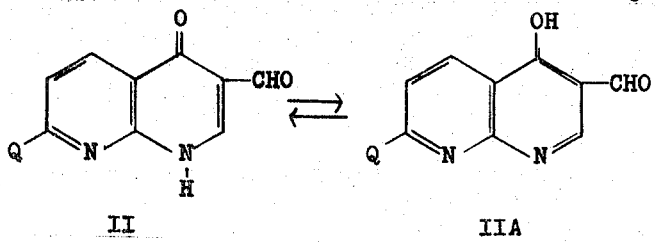

and 1-(lower-alkyl)-1,4-dihydro-4-oxo-7-Q-1,8-naphthyridine-3-carboxaldehyde of formula III

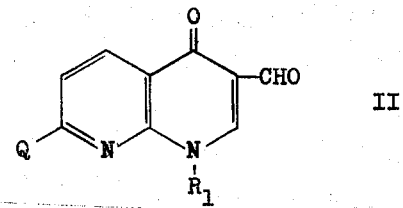

where $R_1$ is lower-alkyl and Q in each of the formulas II, IIA and III is defined as hereinabove.

The term "lower-alkyl," as used herein, e.g., AS represented by $R_1$ in formula III or as a substituent of 4(or 3)-pyridyl when represented by Q in formulas II, IIA or III, means alkyl radicals having from one to six carbon atoms which can be arranged as straight or branched chains, illustrated by methyl, ethyl, n-propyl, isopropyl, n-butyl, sec-butyl, isobutyl, n-amyl, n-hexyl and the like.

The term "lower-alkanoyl," as used herein, e.g., in the definition of the Q substituent as lower-alkanoyloxymethyl in formulas II, IIA or III, means alkanoyl radicals having from one to six carbon atoms, including the straight- and branched-chain radicals, illustrated by formyl, acetyl, propionyl (propanoyl), butyryl (butanoyl), isobutyryl (2-methylpropanoyl) and caproyl (hexanoyl).

Illustrative of the Q substituent in formulas III, IV, IVA and V where Q is 4(or 3)-pyridyl having one or two lower-alkyl substituents are the following: 2-methyl-4-pyridyl, 2,6-dimethyl-4-pyridyl, 3-methyl-4-pyridyl, 2-methyl-3-pyridyl, 6-methyl-3-pyridyl (preferably named 2-methyl-5-pyridyl), 2,3-dimethyl-4-pyridyl, 2,5-dimethyl-4-pyridyl, 2-ethyl-4-pyridyl, 2-isopropyl-4-pyridyl, 2-n-butyl-4-pyridyl, 2-n-hexyl-4-pyridyl, 2,6-diethyl-4-pyridyl, 2,6-diethyl-3-pyridyl, 2,6-diisopropyl-4-pyridyl, 2,6-di-n-hexyl-4-pyridyl and the like. Because of ready availability, ease of preparation and/or high antibacterial activity of the final products, i.e., the 1-(lower-alkyl)-1,4-dihydro-7-[mono(or di)-(lower-alkyl)-4-(or 3)-pyridyl]-4-oxo-1,8-naphthyridine-3-carboxylic acids, preferred embodiments of this group are those where 4(or 3)-pyridyl is substituted by one or two methyls, especially the 2-methyl-4-pyridyl and 2,6-dimethyl-4-pyridyl compounds. Other preferred embodiments are those having unsubstituted-4(or 3)-pyridyl as Q.

As shown above, 1,4-dihydro-7-Q-4-oxo-1,8-naphthyridine-3-carboxaldehyde of formula II is tautomeric with 4-hydroxy-7-Q-1,8-naphthyridine-3-carboxaldehyde of formula IIA. As with all tautomeric systems, the rate of the transformation II ⇌ IIA and the ratio II/IIA are dependent on the thermodynamic environment, including the state of aggregation; so that measurements by any particular techniques do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as II and the names of the compounds herein therefore are preferably based on structure II, although it is understood that either or both structures are comprehended.

The intermediate 1,4-dihydro-4-oxo-7-Q-1,8-naphthyridines (I) or tautomers (IA) are either known or, where novel, are prepared from known compounds by methods illustrated hereinbelow.

One such method, which is disclosed and claimed in copending application Ser. No. 335,733, filed Feb. 26, 1973, comprises the steps of reacting cyclic alkylidenyl N-(6-Q-2-pyridyl)aminomethylenemalonate, where Q is lower-alkyl, 4(or 3)-pyridyl, or 4(or 3)-pyridyl having one or two lower-alkyl substituents, with an oxidizing agent capable of converting pyridines to pyridine-N-oxides to produce cyclic alkylidenyl N-(6-Q'-1-oxo-2-pyridyl)aminomethylenemalonate, where Q' is lower-alkyl, 1-oxo-4(or 3)-pyridyl or 1-oxo-4(or 3)-pyridyl having ore or two lower-alkyl substituents, heating said 6-Q'-1-oxo-2-pyridyl compound to produce 1,4-dihydro-4-oxo-7-Q'-1,8-naphthyridine-8-oxide and then converting said 8-oxide to the corresponding 1,4- dihydro-4-oxo-7-Q-1,8-naphthyridine. Illustrations of this method are given below in Examples 64-110.

The molecular structures of the composition aspects (II, IIA and III) of our invention were assigned on the basis of evidence provided by infrared, ultraviolet and nuclear magnetic resonance spectra, by chromatographic mobilities, and, by the correspondence of calculated and found values for the elementary analyses for representative examples.

The manner of making and using the instant invention will now be generally described so as to enable a person skilled in the art of chemistry to make and use the same, as follows:

The reaction of 1,4-dihydro-4-oxo-7-Q-1,8-naphthyridine (I) or its tautomeric 4-hydroxy-7-Q-1,8-naphthyridine (IA) with a formylating agent to produce 1,4-dihydro-4-oxo-7-Q-1,8-naphthyridine-3-carboxaldehyde (II) or its tautomeric 4-hydroxy-7-Q-1,8-naphthyridine-3-carboxaldehyde (IIA) is carried out preferably by reacting I (or IA) with phosphorus oxyhalide and dimethylformamide to form the corresponding 3-dimethylformiminium halide, e.g., 3—CH=N$^+$(CH$_3$)$_2$Cl$^-$ using phosphorus oxychloride, and then making the reaction mixture alkaline to produce the corresponding 3—CHO compound (II or IIA). The reaction is conveniently run by adding the phosphorus oxyhalide to a stirred mixture of I (or IA) and dimethylformamide. After the exothermic reaction subsides, the reaction mixture is gently heated, e.g., on a steam bath, to ensure completion of the reaction, cooled and poured into cold water and the resulting reaction mixture is made alkaline, e.g., using aqueous sodium or potassium hydroxide or the like, to convert the 3-dimethylformiminium halide to the 3-carboxaldehyde. Because of its ready availability and low cost, phosphorus oxychloride is preferably used. Alternatively, in place of phosphorus oxychloride there can be used phosphorus pentachloride, thionyl chloride, oxalyl chloride, phosphorus oxybromide, phosphorus tribromide, and the like. Also, in place of dimethylformamide there can be used N-methyl-N-phenylformamide.

The reaction of 1,4-dihydro-4-oxo-7-Q-1,8-naphthyridine-3-carboxaldehyde (II) or its tautomeric 4-hydroxy-7-Q-1,8-naphthyridine-3-carboxaldehyde (IIA) with a lower-alkylating agent to produce 1-(lower-alkyl)-1,4-dihydro-4-oxo-7-Q-1,8-naphthyridine-3-carboxaldehyde (III) is generally carried out by reacting said compound of formula II or IIA with a lower-alkyl ester of a strong inorganic acid or an organic sulfonic acid, said ester having the formula R$_1$—An, where An is an anion of a strong inorganic acid or an organic sulfonic acid, e.g., chloride, bromide, iodide, sulfate, methanesulfonate, benzenesulfonate, and para-toluenesulfonate, and R$_1$ is lower-alkyl. This alkylation is preferably run using a slight excess of the alkylating agent although equimolar quantities give satisfactory results. The chloride, bromide or iodide is preferred because of the ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The acid-acceptor takes up the hydrogen halide (or HAn) which is split out during the course of the reaction. The reaction is preferably carried out in the presence of a suitable solvent which is inert under the reaction conditions, e.g., a solvent such as lower-alkanol, acetone, dioxane, dimethylformamide, dimethyl sulfoxide, hexamethyl phosphoramide, or a mixture of solvents, e.g., a mixture of water and a lower-alkanol. The reaction is generally carried out at a temperature between about room temperature (about 20°–25°C.) and 150°C., preferably heating on a steam bath in a stirred mixture of dimethylformamide and anhydrous potassium carbonate.

The reaction of 1-(lower-alkyl)-1,4-dihydro-4-oxo-7-Q-1,8-naphthyridine-3-carboxaldehyde (III) with an oxidizing agent to produce 1-(lower-alkyl)-1,4-dihydro-4-oxo-7-Q-1,8-naphthyridine-3-carboxylic acid (IV) is generally carried out by reacting III with an oxidizing agent capable of converting formyl to carboxy. Such oxidizing agents are, for example, an alkali permanganate, e.g., KMnO$_4$, in a basic or an acidic medium; an alkali dichromate, e.g., Na$_2$Cr$_2$O$_7$, or chromic anhydride (CrO$_3$) under acidic conditions, preferably using sulfuric acid; aqueous nitric acid, e.g., 20–35% HNO$_3$; and the like. The reaction conditions vary and are dependent upon the particular oxidizing agent used. For example, oxidation with potassium permanganate is conveniently run at low temperature, preferably below 20°C., in a basic medium, preferably in pyridine which also acts as solvent or in aqueous sodium or potassium hydroxide solution or in aqueous sulfuric acid, preferably using about two moles of potassium permanganate per three moles of the 3-carboxaldehyde. Oxidation using nitric acid is conveniently run by heating a stirred mixture of the 3-carboxaldehyde with an excess of 30% nitric acid.

Alternatively, the 3-carboxaldehyde (III) can be converted to the 3-carboxylic acid (IV) via the 3-cyano compound.

The best mode contemplated for carrying out the invention is now set forth as follows:

EXAMPLE 1

1,4-Dihydro-7-methyl-4-oxo-1,8-naphthyridine-3-carboxaldehyde

To 6.3 g. of 1,4-dihydro-7-methyl-4-oxo-1,8-naphthyridine (tautomeric with 4-hydroxy-7-methyl-1,8-naphthyridine) and 60 ml. of dimethylformamide is slowly added with stirring 5.5 ml. of phosphorus oxychloride. The reaction mixture is then heated with stirring on a steam bath for about 1 hour, cooled in an ice bath and poured into 175 ml. of ice water. The mixture is made alkaline with 30 ml. of 35% aqueous sodium hydroxide solution to convert the 3-dimethylformiminium chloride to the 3-carboxaldehyde. The alkaline solution is made acidic with 6N hydrochloric acid and the resulting precipitate is collected, washed with water, dried in vacuo at 60°C. and is recrystallized from dimethylformamide to yield 1,4-dihydro-7-methyl-4-oxo-1,8-naphthyridine-3-carboxaldehyde.

EXAMPLE 2

1-Ethyl-1,4-dihydro-7-methyl-4-oxo-1,8-naphthyridine-3-carboxaldehyde

To a stirred suspension heated on a steam bath and containing 3.8 g. of 1,4-dihydro-7-methyl-4-oxo-1,8-naphthyridine-3-carboxaldehyde in 30 ml. of dimethylformamide is added 8.3 g. of anhydrous potassium carbonate and the mixture is stirred for about 15 minutes. To the stirred hot mixture is added 3.8 g. of ethyl iodide and the resulting mixture is stirred with heating on the steam bath for ninety minutes. The hot reaction mixture is poured into three volumes of ice water. The resulting precipitate is collected, triturated with warm water, washed sparingly with warm water and dried in vacuo at 60°C. to yield 1-ethyl-1,4-dihydro-7-methyl-4-oxo-1,8-naphthyridine-3-carboxaldehyde. When recrystallized successively from isopropyl alcohol and ethyl acetate, this compound melted at 186°–188°C.

EXAMPLE 3

1-Ethyl-1,4-dihydro-7-methyl-4-oxo-1,8-naphthyridine-3-carboxylic acid

A suspension of 3.3 g. of 1-ethyl-1,4-dihydro-7-methyl-4-oxo-1,8-naphthyridine-3-carboxaldehyde in 35 ml. of pyridine and 7 ml. of water is stirred and cooled to 10°C. in an ice bath. Solid potassium permanganate (7.5 g.) is added in small portions over the course of about 55 minutes. The temperature is not allowed to rise above 15°C. and small amounts of water totalling 35 ml. is added during the course of the addition. The resulting mixture is stirred about thirty minutes longer at 10°–20°C. and then filtered through infusorial earth. The cake of collected manganese dioxide is washed with a little water and the combined filtrates are treated with saturated aqueous sodium bisulfite solution until the excess permanganate is destroyed. The solution is then acidified with excess 6N hydrochloric acid. After cooling in ice, the precipitated solid is collected by vacuum, rinsed with fresh water and sucked as dry as possible. The material is recrystallized from 18 ml. of dimethylformamide and dried for 18 hours in a vacuum oven (80°C.). There is obtained, as pale yellow crystals, 1-ethyl-1,4-dihydro-7-methyl-4-oxo-1,8-naphthyridine-3-carboxylic acid, m.p. 232°–234°C. A mixed melting point with authentic material is undepressed.

This oxidation also is run as follows: A mixture of 2.5 g. of 1-ethyl-1,4-dihydro-7-methyl-4-oxo-1,8-naphthyridine-3-carboxaldehyde and 70 g. of 30% aqueous nitric acid is stirred vigorously on a steam bath until a test portion shows almost complete solubility in dilute aqueous sodium hydroxide solution. The reaction mixture is cooled, made alkaline with sodium hydroxide solution, washed with benzene, treated with decolorizing charcoal and filtered. The filtrate is slowly acidified with dilute hydrochloric acid with stirring. The precipitated 3-carboxylic acid is collected, washed with water, dried and recrystallized from dimethylformamide to yield 1-ethyl-1,4-dihydro-7-methyl-4-oxo-1,8-naphthyridine-3-carboxylic acid.

Following the procedure described in Example 1 but using in place of 1,4-dihydro-7-methyl-4-oxo-1,8-naphthyridine a molar equivalent quantity of the appropriate 1,4-dihydro-4-oxo-7-Q-1,8-naphthyridine, the compounds of Examples 4–19 are obtained:

EXAMPLE 4

7-Ethyl-1,4-dihydro-4-oxo-1,8-naphthyridine-3-carboxaldehyde using 7-ethyl-1,4-dihydro-4-oxo-1,8-naphthyridine.

EXAMPLE 5

1,4-Dihydro-4-oxo-7-n-propyl-1,8-naphthyridine-3-carboxaldehyde using 1,4-dihydro-4-oxo-7-n-propyl-1,8-naphthyridine.

EXAMPLE 6

1,4-Dihydro-7-isobutyl-4-oxo-1,8-naphthyridine-3-carboxaldehyde using 1,4-dihydro-7-isobutyl-4-oxo-1,8-naphthyridine.

EXAMPLE 7

7-n-Hexyl-1,4-dihydro-4-oxo-1,8-naphthyridine-3-carboxaldehyde using 7-n-hexyl-1,4-dihydro-4-oxo-1,8-naphthyridine.

EXAMPLE 8

7-Acetoxymethyl-1,4-dihydro-4-oxo-1,8-naphthyridine-3-carboxaldehyde using 7-acetoxymethyl-1,4-dihydro-4-oxo-1,8-naphthyridine.

EXAMPLE 9

1,4-Dihydro-4-oxo-7-propionoxymethyl-1,8-naphthyridine-3-carboxaldehyde using 1,4-dihydro-4-oxo-7-propionoxymethyl-1,8-naphthyridine.

EXAMPLE 10

1,4-Dihydro-7-isobutyroxymethyl-4-oxo-1,8-naphthyridine-3-carboxaldehyde using 1,4-dihydro-7-isobutyroxymethyl-4-oxo-1,8-naphthyridine.

EXAMPLE 11

7-Hexanoyloxymethyl-1,4-dihydro-4-oxo-1,8-naphthyridine-3-carboxaldehyde using 7-hexanoyloxymethyl-1,4-dihydro-4-oxo-1,8-naphthyridine.

EXAMPLE 12

1,4-Dihydro-4-oxo-7-(4-pyridyl)-1,8-naphthyridine-3-carboxaldehyde using 1,4-dihydro-4-oxo-7-(4-pyridyl)-1,8-naphthyridine.

EXAMPLE 13

1,4-Dihydro-4-oxo-7-(3-pyridyl)-1,8-naphthyridine-3-carboxaldehyde using 1,4-dihydro-4-oxo-7-(3-pyridyl)-1,8-naphthyridine.

EXAMPLE 14

1,4-Dihydro-7-(2-methyl-4-pyridyl)-4-oxo-1,8-naphthyridine-3-carboxaldehyde using 1,4-dihydro-7-(2-methyl-4-pyridyl)-4-oxo-1,8-naphthyridine.

EXAMPLE 15

1,4-Dihydro-7-(3-methyl-4-pyridyl)-1,8-naphthyridine-3-carboxaldehyde using 1,4-dihydro-7-(3-methyl-4-pyridyl)-4-oxo-1,8-naphthyridine.

EXAMPLE 16

7-(2-Ethyl-4-pyridyl)-1,4-dihydro-4-oxo-1,8-naphthyridine-3-carboxaldehyde using 7-(2-ethyl-4-pyridyl)-1,4-dihydro-4-oxo-1,8-naphthyridine.

EXAMPLE 17

7-(3-Ethyl-4-pyridyl)-1,4-dihydro-4-oxo-1,8-naphthyridine-3-carboxaldehyde using 7-(3-ethyl-4-pyridyl)-1,4-dihydro-4-oxo-1,8-naphthyridine.

EXAMPLE 18

1,4-Dihydro-7-(2,6-dimethyl-4-pyridyl)-4-oxo-1,8-naphthyridine-3-carboxaldehyde using 1,4-dihydro-7-(2,6-dimethyl-4-pyridyl)-4-oxo-1,8-naphthyridine.

EXAMPLE 19

1,4-Dihydro-7-(3,5-dimethyl-4-pryidyl)4-oxo-1,8-naphthyridine-3-carboxaldehyde using 1,4-dihydro-7-(3,5-dimethyl-4-pyridyl)-4-oxo-1,8-naphthyridine.

Following the procedure described in Example 2 but using in place of 1,4-dihydro-7-methyl-4-oxo-1,8-naphthyridine-3-carboxaldehyde a molar equivalent quantity of the appropriate 1,4-dihydro-4-oxo-7-Q-1,8-naphthyridine-3-carboxaldehyde, the compounds of Examples 20–35 are obtained:

EXAMPLE 20

1,7-Diethyl-1,4-dihydro-4-oxo-1,8-naphthyridine-3-carboxaldehyde using 7-ethyl-1,4-dihydro-4-oxo-1,8-naphthyridine-3-carboxaldehyde. Similarly, using said 7-ethyl compound and a molar equivalent quantity of dimethyl sulfate, n-propyl iodide, isobutyl bromide or n-hexyl chloride in place of ethyl iodide, there is obtained 7-ethyl-1,4-dihydro-1-methyl-4-oxo-1,8-naphthyridine-3-carboxaldehyde, 7-ethyl-1,4-dihydro-4-oxo-1-n-propyl-1,8-naphthyridine-3-carboxaldehyde, 7-ethyl-1,4-dihydro-1-isobutyl-4-oxo-1,8-naphthyridine-3-carboxaldehyde or 7-ethyl-1-n-hexyl-1,4-dihydro-4-oxo-1,8-naphthyridine-3-carboxaldehyde, respectively.

EXAMPLE 21

1-Ethyl-1,4-dihydro-4-oxo-7-n-propyl-1,8-naphthyridine-3-carboxaldehyde using 1,4-dihydro-4-oxo-7-n-propyl-1,8-naphthyridine-3-carboxaldehyde.

EXAMPLE 22

1-Ethyl-1,4-dihydro-7-isobutyl-4-oxo-1,8-naphthyridine-3-carboxaldehyde using 1,4-dihydro-7-isobutyl-4-oxo-1,8-naphthyridine-3-carboxaldehyde.

EXAMPLE 23

1-Ethyl-7-n-hexyl-1,4-dihydro-4-oxo-1,8-naphthyridine-3-carboxaldehyde using 7-n-hexyl-1,4-dihydro-4-oxo-1,8-naphthyridine-3-carboxaldehyde.

EXAMPLE 24

7-Acetoxymethyl-1-ethyl-1,4-dihydro-4-oxo-1,8-naphthyridine-3-carboxaldehyde using 7-acetoxymethyl-1,4-dihydro-4-oxo-1,8-naphthyridine-3-carboxaldehyde. Similarly, using said 7-acetoxymethyl compound and a molar equivalent quantity of dimethyl sulfate, n-propyl iodide, isobutyl bromide or n-hexyl chloride in place of ethyl iodide, there is obtained 7-acetoxymethyl-1,4-dihydro-1-methyl-4-oxo-1,8-naphthyridine-3-carboxaldehyde, 7-acetoxymethyl-1,4-dihydro-4-oxo-1-n-propyl-1,8-naphthyridine-3-carboxaldehyde, 7-acetoxymethyl-1,4-dihydro-1-isobutyl-4-oxo-1,8-naphthyridine-3-carboxaldehyde or 7-acetoxymethyl-1-n-hexyl-1,4-dihydro-4-oxo-1,8-naphthyridine-3-carboxaldehyde, respectively.

EXAMPLE 25

1-Ethyl-1,4-dihydro-4-oxo-7-propionoxymethyl-1,8-naphthyridine-3-carboxaldehyde using 1,4-dihydro-4-oxo-7-propionoxymethyl-1,8-naphthyridine-3-carboxaldehyde.

EXAMPLE 26

1-Ethyl-1,4-dihydro-7-isobutyroxymethyl-4-oxo-1,8-naphthyridine-3-carboxaldehyde using 1,4-dihydro-7-isobutyroxymethyl-4-oxo-1,8-naphthyridine-3-carboxaldehyde.

EXAMPLE 27

1-Ethyl-7-hexanoyloxymethyl-1,4-dihydro-4-oxo-1,8-naphthyridine-3-carboxaldehyde using 7-hexanoyloxymethyl-1,4-dihydro-4-oxo-1,8-naphthyridine-3-carboxaldehyde.

EXAMPLE 28

1-Ethyl-1,4-dihydro-4-oxo-7-(4-pyridyl)-1,8-naphthyridine-3-carboxaldehyde using 1,4-dihydro-4-oxo-7-(4-pyridyl)-1,8-naphthyridine-3-carboxaldehyde. Similarly, using said 7-(4-pyridyl) compound and a molar equivalent quantity of dimethyl sulfate, n-propyl iodide, isobutyl bromide or n-hexyl chloride in place of ethyl iodide, there is obtained 1,4-dihydro-1-methyl-4-oxo-7-(4-pyridyl)-1,8-naphthyridine-3-carboxaldehyde, 1,4-dihydro-4-oxo-1-n-propyl-7-(4-pyridyl)-1,8-naphthyridine-3-carboxaldehyde, 1,4-dihydro-1-isobutyl-4-oxo-7-(4-pyridyl)-1,8-naphthyridine-3-carboxaldehyde or 1-n-hexyl-1,4-dihydro-4-oxo-7-(4-pyridyl)-1,8-naphthyridine-3-carboxaldehyde, respectively.

EXAMPLE 29

1-Ethyl-1,4-dihydro-4-oxo-7-(3-pyridyl)-1,8-naphthyridine-3-carboxaldehyde using 1,4-dihydro-4-oxo-7-(3-pyridyl)-1,8-naphthyridine-3-carboxaldehyde.

EXAMPLE 30

1-Ethyl-1,4-dihydro-7-(2-methyl-4-pyridyl)-4-oxo-1,8-naphthyridine-3-carboxaldehyde using 1,4-dihydro-7-(2-methyl-4-pyridyl)-4-oxo-1,8-naphthyridine-3-carboxaldehyde.

EXAMPLE 31

1-Ethyl-1,4-dihydro-7-(3-methyl-4-pyridyl)-1,8-naphthyridine-3-carboxaldehyde using 1,4-dihydro-7-(3-methyl-4-pyridyl)-4-oxo-1,8-naphthyridine-3-carboxaldehyde.

EXAMPLE 32

1-Ethyl-7-(2-ethyl-4-pyridyl)-1,4-dihydro-4-oxo-1,8-naphthyridine-3-carboxaldehyde using 7-(2-ethyl-4-pyridyl)-1,4-dihydro-4-oxo-1,8-naphthyridine-3-carboxaldehyde.

EXAMPLE 33

1-Ethyl-7-(3-ethyl-4-pyridyl)-1,4-dihydro-4-oxo-1,8-naphthyridine-3-carboxaldehyde using 7-(3-ethyl-4-pyridyl)-1,4-dihydro-4-oxo-1,8-naphthyridine-3-carboxaldehyde.

EXAMPLE 34

1-Ethyl-1,4-dihydro-7-(2,6-dimethyl-4-pyridyl)-4-oxo-1,8-naphthyridine-3-carboxaldehyde using 1,4-dihydro-7-(2,6-dimethyl-4-pyridyl)-4-oxo-1,8-naphthyridine-3-carboxaldehyde.

EXAMPLE 35

1-Ethyl-1,4-dihydro-7-(3,5-dimethyl-4-pyridyl)-4-oxo-1,8-naphthyridine-3-carboxaldehyde using 1,4-dihydro-7-(3,5-dimethyl-4-pyridyl)-4-oxo-1,8-naphthyridine-3-carboxaldehyde.

Following the procedure described in Example 3 but using a molar equivalent quantity of the appropriate 1-alkyl-1,4-dihydro-4-oxo-7-Q-1,8-naphthyridine-3-carboxaldehyde in place of 1-ethyl-1,4-dihydro-7-methyl-4-oxo-1,8-naphthyridine-3-carboxaldehyde there are obtained the corresponding 1-alkyl-1,4-dihydro-4-oxo-7-Q-1,8-naphthyridine-3-carboxylic acids of Examples 36–63.

EXAMPLE 36

1,7-Diethyl-1,4-dihydro-4-oxo-1,8-naphthyridine-3-carboxylic acid using 1,7-diethyl-1,4-dihydro-4-oxo-1,8-naphthyridine-3-carboxaldehyde.

EXAMPLE 37

7-Ethyl-1,4-dihydro-1-methyl-4-oxo-1,8-naphthyridine-3-carboxylic acid using 7-ethyl-1,4-dihydro-1-methyl-4-oxo-1,8-naphthyridine-3-carboxaldehyde.

EXAMPLE 38

7-Ethyl-1,4-dihydro-4-oxo-1-n-propyl-1,8-naphthyridine-3-carboxylic acid using 7-ethyl-1,4-dihydro-4-oxo-1-n-propyl-1,8-naphthyridine-3-carboxaldehyde.

EXAMPLE 39

7-Ethyl-1,4-dihydro-1-isobutyl-4-oxo-1,8-naphthyridine-3-carboxylic acid using 7-ethyl-1,4-dihydro-1-isobutyl-4-oxo-1,8-naphthyridine-3-carboxaldehyde.

EXAMPLE 40

7-Ethyl-1-n-hexyl-1,4-dihydro-4-oxo-1,8-naphthyridine-3-carboxylic acid using 7-ethyl-1-n-hexyl-1,4-dihydro-4-oxo-1,8-naphthyridine-3-carboxaldehyde.

EXAMPLE 41

1-Ethyl-1,4-dihydro-4-oxo-7-n-propyl-1,8-naphthyridine-3-carboxylic acid using 1-ethyl-1,4-dihydro-4-oxo-7-n-propyl-1,8-naphthyridine-3-carboxaldehyde.

EXAMPLE 42

1-Ethyl-1,4-dihydro-7-isobutyl-4-oxo-1,8-naphthyridine-3-carboxylic acid using 1-ethyl-1,4-dihydro-7-isobutyl-4-oxo-1,8-naphthyridine-3-carboxaldehyde.

EXAMPLE 43

1-Ethyl-7-n-hexyl-1,4-dihydro-4-oxo-1,8-naphthyridine-3-carboxylic acid using 1-ethyl-7-n-hexyl-1,4-dihydro-4-oxo-1,8-naphthyridine-3-carboxaldehyde.

EXAMPLE 44

7-Acetoxymethyl-1,4-dihydro-1-methyl-4-oxo-1,8-naphthyridine-3-carboxylic acid using 7-acetoxymethyl-1,4-dihydro-1-methyl-4-oxo-1,8-naphthyridine-3-carboxaldehyde.

EXAMPLE 45

7-Acetoxymethyl-1,4-dihydro-4-oxo-1-n-propyl-1,8-naphthyridine-3-carboxylic acid using 7-acetoxymethyl-1,4-dihydro-4-oxo-1-n-propyl-1,8-naphthyridine-3-carboxaldehyde.

EXAMPLE 46

7-Acetoxymethyl-1,4-dihydro-1-isobutyl-4-oxo-1,8-naphthyridine-3-carboxylic acid using 7-acetoxymethyl-1,4-dihydro-1-isobutyl-4-oxo-1,8-naphthyridine-3-carboxaldehyde.

EXAMPLE 47

7-Acetoxymethyl-1-n-hexyl-1,4-dihydro-4-oxo-1,8-naphthyridine-3-carboxylic acid using 7-acetoxymethyl-1-n-hexyl-1,4-dihydro-4-oxo-1,8-naphthyridine-3-carboxaldehyde.

EXAMPLE 48

7-Acetoxymethyl-1-ethyl-1,4-dihydro-4-oxo-1,8-naphthyridine-3-carboxylic acid using 7-acetoxymethyl-1-ethyl-1,4-dihydro-4-oxo-1,8-naphthyridine-3-carboxaldehyde.

EXAMPLE 49

1-Ethyl-1,4-dihydro-4-oxo-7-propionoxymethyl-1,8-naphthyridine-3-carboxylic acid using 1-ethyl-1,4-dihydro-4-oxo-7-propionoxymethyl-1,8-naphthyridine-3-carboxaldehyde.

EXAMPLE 50

1-Ethyl-1,4-dihydro-7-isobutyroxymethyl-4-oxo-1,8-naphthyridine-3-carboxylic acid using 1-ethyl-1,4-dihydro-7-isobutyroxymethyl-4-oxo-1,8-naphthyridine.

EXAMPLE 51

1-Ethyl-7-hexanoyloxymethyl-1,4-dihydro-4-oxo-1,8-naphthyridine-3-carboxylic acid using 1-ethyl-7-hexanoyloxymethyl-1,4-dihydro-4-oxo-1,8-naphthyridine-3-carboxaldehyde.

EXAMPLE 52

1-Ethyl-1,4-dihydro-4-oxo-7-(4-pyridyl)-1,8-naphthyridine-3-carboxylic acid using 1-ethyl-1,4-dihydro-4-oxo-7-(4-pyridyl)-1,8-naphthyridine-3-carboxaldehyde.

EXAMPLE 53

1,4-Dihydro-1-methyl-4-oxo-7-(4-pyridyl)-1,8-naphthyridine-3-carboxylic acid using 1,4-dihydro-1-methyl-4-oxo-7-(4-pyridyl)-1,8-naphthyridine-3-carboxaldehyde.

EXAMPLE 54

1,4-Dihydro-4-oxo-1-n-propyl-7-(4-pyridyl)-1,8-naphthyridine-3-carboxylic acid using 1,4-dihydro-4-oxo-1-n-propyl-7-(4-pyridyl)-1,8-naphthyridine-3-carboxaldehyde.

EXAMPLE 55

1,4-Dihydro-1-isobutyl-4-oxo-7-(4-pyridyl)-1,8-naphthyridine-3-carboxylic acid using 1,4-dihydro-1-isobutyl-4-oxo-7-(4-pyridyl)-1,8-naphthyridine-3-carboxaldehyde.

EXAMPLE 56

1-n-Hexyl-1,4-dihydro-4-oxo-7-(4-pyridyl)-1,8-naphthyridine-3-carboxylic acid using 1-n-hexyl-1,4-dihydro-4-oxo-7-(4-pyridyl)-1,8-naphthyridine-3-carboxaldehyde.

EXAMPLE 57

1-Ethyl-1,4-dihydro-4-oxo-7-(3-pyridyl)-1,8-naphthyridine-3-carboxylic acid using 1-ethyl-1,4-dihydro-4-oxo-7-(3-pyridyl)-1,8-naphthyridine-3-carboxaldehyde.

EXAMPLE 58

1-Ethyl-1,4-dihydro-7-(2-methyl-4-pyridyl)-4-oxo-1,8-naphthyridine-3-carboxylic acid using 1-ethyl-1,4-dihydro-7-(2-methyl-4-pyridyl)-4-oxo-1,8-naphthyridine-3-carboxaldehyde.

EXAMPLE 59

1Ethyl-1,4-dihydro-7-(3-methyl-4-pyridyl)-1,8-naphthyridine-3-carboxylic acid using 1-ethyl-1,4-dihydro-7-(3-methyl-4-pyridyl)-1,8-naphthyridine-3-carboxaldehyde.

EXAMPLE 60

1-Ethyl-7-(2-ethyl-4-pyridyl)-1,4-dihydro-4-oxo-1,8-naphthyridine-3-carboxylic acid using 1-ethyl-7-(2-ethyl-4-pyridyl)-1,4-dihydro-4-oxo-1,8-naphthyridine-3-carboxaldehyde.

EXAMPLE 61

1-Ethyl-7-(3-ethyl-4-pyridyl)-1,4-dihydro-4-oxo-1,8-naphthyridine-3-carboxylic acid using 1-ethyl-7-(3-ethyl-4-pyridyl)-1,4-dihydro-4-oxo-1,8-naphthyridine-3-carboxaldehyde.

EXAMPLE 62

1-Ethyl-1,4-dihydro-7-(2,6-dimethyl-4-pyridyl)-4-oxo-1,8-naphthyridine-3-carboxylic acid using 1-ethyl-1,4-dihydro-7-(2,6-dimethyl-4-pyridyl)-4-oxo-1,8-naphthyridine-3-carboxaldehyde.

EXAMPLE 63

1-Ethyl-1,4-dihydro-7-(3,5-dimethyl-4-pyridyl)-4-oxo-1,8-naphthyridine-3-carboxylic acid using 1-ethyl-1,4-dihydro-7-(3,5-dimethyl-4-pyridyl)-4-oxo-1,8-naphthyridine-3-carboxaldehyde.

The following Examples 64–110 illustrate the preparation of the intermediate 1,4-dihydro-4-oxo-7-Q-1,8-naphthyridines, said preparation being disclosed and claimed in copending U.S. Patent Appln. Serial No. 335,733.

EXAMPLE 64

Cyclic isopropylidenyl N-(6-methyl-1-oxo-2-pyridyl(aminomethylenemalonate

To a solution containing 26.2 g. of cyclic isopropylidenyl N-(6-methyl-2-pyridyl)aminomethylenemalonate in 150 ml. of chloroform is slowly added with stirring 19 g. of 3-chloroperbenzoic acid, keeping the reaction temperature below about 40°C. After the addition is completed, the reaction mixture is heated on a steam bath for about thirty minutes. The reaction mixture is extracted successively with 50 ml. of ice cold 10% aqueous potassium bicarbonate solution, 70 ml. of water, 30 ml. of ice cold 10% aqueous potassium bicarbonate solution and 25 ml. of water. The resulting chloroform solution is washed with water, dried over anhydrous potassium carbonate, filtered and the filtrate concentrated in vacuo to remove the chloroform. The remaining solid is triturated with isopropyl alcohol and then recrystallized from ethanol using decolorizing charcoal to yield cyclic isopropylidenyl N-(6-methyl-1-oxo-2-pyridyl)aminomethylene-malonate, m.p. 222°–223°C. with decomposition.

The above preparation also is carried out using a molar equivalent quantity of other oxidizing agents in a suitable solvent inert under the reaction conditions, e.g., use of peracetic acid in acetic acid.

EXAMPLE 65

1,4-Dihydro-7-methyl-4-oxo-1,8-naphthyridine-8-oxide

To a 150 ml. portion of diethyl phthalate heated to 275°C. is added with stirring 2.78 g. of cyclic isopropylidenyl N-(6-methyl-1-oxo-2-pyridyl)aminomethylenemalonate. The stirred reaction mixture is heated at the same temperature for two minutes and then allowed to cool to room temperature. The precipitated solid is collected, washed well with ether and air-dried to yield the product, 1,4-dihydro-7-methyl-4-oxo-1,8-naphthyridine-8-oxide, which is tautomeric with 4-hydroxy-7-methyl-1,8-naphthyridine-8-oxide. Recrystallization, if desired, is carried out using dimethylformamide.

The above cyclization also is carried out in 225 ml. of refluxing Dowtherm A in place of the diethyl phthalate.

EXAMPLE 66

1,4-Dihydro-7-methyl-4-oxo-1,8-naphthyridine

A mixture containing 8.75 g. of 1,4-dihydro-7-methyl-4-oxo-1,8-naphthyridine-8-oxide, 250 ml. of absolute ethanol and 5 g. of Raney nickel is hydrogenated at about 25°C. in a Parr apparatus using an initial pressure of 55 p.s.i. of hydrogen. The catalyst is filtered off, the filtrate treated with decolorizing charcoal and filtered, and the filtrate concentrated in vacuo and chilled. The precipitate is collected, recrystallized from ethanol and dried over $P_2O_5$ at 25°C. overnight to yield 1,4-dihydro-7-methyl-4-oxo-1,8-naphthyridine, m.p. 235°–236°C. When recrystallized from water and dried, this compound melted at 235°–237°C.

Following the procedure described in Example 64 but using in place of cyclic isopropylidenyl N-(6-methyl-2-pyridyl)aminomethylenemalonate a molar equivalent quantity of the appropriate cyclic alkylidenyl N-(6-Q-2-pyridyl)aminomethylenemalonate, the compounds of Examples 67–81 are obtained:

EXAMPLE 67

Cyclic isopropylidenyl N-(6-ethyl-1-oxo-2-pyridyl)aminomethylenemalonate using cyclic isopropylidenyl N-(6-ethyl-2-pyridyl)aminomethylenemalonate, the latter prepared by reacting 2-amino-6-ethylpyridine with a mixture of triethyl orthoformate and cyclic isopropylidenyl malonate.

EXAMPLE 68

Cyclic isopropylidenyl N-(1-oxo-6-n-propyl-2-pyridyl)aminomethylenemalonate using cyclic isopropylidenyl N-(6-n-propyl-2-pyridyl)aminomethylenemalonate, the latter prepared by reacting 2-amino-6-n-propylpyridine with a mixture of triethyl orthoformate and cyclic isopropylidenyl malonate.

EXAMPLE 69

Cyclic isopropylidenyl N-(6-isopropyl-1-oxo-2-pyridyl)aminomethylenemalonate using cyclic isopropylidenyl N-(6-isopropyl-2-pyridyl)aminomethylenemalonate, the latter prepared by reacting 2-amino-6-isopropylpyridine with a mixture of triethyl orthoformate and cyclic isopropylidenyl malonate.

EXAMPLE 70

Cyclic isopropylidenyl N-(6-n-butyl-1-oxo-2-pyridyl)aminomethylenemalonate using cyclic isopropylidenyl N-(6-n-butyl-2-pyridyl)aminomethylenemalonate, the latter prepared by reacting 2-amino-6-n-butylpyridine with a mixture of triethyl orthoformate and cyclic isopropylidenyl malonate.

EXAMPLE 71

Cyclic isopropylidenyl N-(6-n-hexyl-1-oxo-2-pyridyl)aminomethylenemalonate using cyclic isopropylidenyl N-(6-n-hexyl-2-pyridyl)aminomethylenemalonate, the latter prepared by reacting 2-amino-6-n-hexylpyridine with a mixture of triethyl orthoformate and cyclic isopropylidenyl malonate.

EXAMPLE 72

Cyclic 3-pentylidenyl N-(6-methyl-1-oxo-2-pyridyl)aminomethylenemalonate using cyclic 3-pentylidenyl N-(6-methyl-2-pyridyl(aminomethylenemalonate, the latter prepared by reacting 2-amino-6-methylpyridine with a mixture of triethyl orthoformate and cyclic 3-pentylidenyl malonate.

EXAMPLE 73

Cyclic 2-butylidenyl N-(6-methyl-1-oxo-2-pyridyl)aminomethylenemalonate using cyclic 2-butylidenyl N-(6-methyl-2-pyridyl)aminomethylenemalonate, the latter prepared by reacting 2-amino-6-methylpyridine with a mixture of triethyl orthoformate and cyclic 2-butylidenyl malonate.

EXAMPLE 74

Cyclic 4-heptylidenyl N-(6-methyl-1-oxo-2-pyridyl)aminomethylenemalonate using cyclic 4-heptylidenyl N-(6-methyl-2-pyridyl)aminomethylenemalonate, the latter prepared by reacting 2-amino-6-methylpyridine with a mixture of triethyl orthoformate and cyclic 4-heptylidenyl malonate.

EXAMPLE 75

Cyclic isopropylidenyl N-[1-oxo-6-(1-oxo-4-pyridyl)-2-pyridyl]aminomethylenemalonate using cyclic isopropylidenyl N-[6-(4-pyridyl)-2-pyridyl]aminomethylene-malonate, the latter prepared by reacting 2-amino-6-(4-pyridyl)-pyridine with a mixture of triethyl orthoformate and cyclic isopropylidenyl malonate.

EXAMPLE 76

Cyclic isopropylidenyl N-[1-oxo-6-(1-oxo-3-pyridyl)-2-pyridyl]aminomethylenemalonate using cyclic isopropylidenyl N-[6-(3-pyridyl)-2-pyridyl]aminomethylenemalonate, the latter prepared by reacting 2-amino-6-(3-pyridyl)pyridine with a mixture of triethyl orthoformate and cyclic isopropylidenyl malonate.

EXAMPLE 77

Cyclic isopropylidenyl N-[1-oxo-6-(2-methyl-1-oxo-4-pyridyl)-2-pyridyl]aminomethylenemalonate using cyclic isopropylidenyl N-[6-(2-methyl-4-pyridyl)-2-pyridyl]aminomethylenemalonate, the latter prepared by reacting 2-amino-6-(2-methyl-4-pyridyl)pyridine with a mixture of triethyl orthoformate and cyclic isopropylidenyl malonate.

EXAMPLE 78

Cyclic isopropylidenyl N-[1-oxo-6-(2-ethyl-1-oxo-4-pyridyl)-2-pyridyl]aminomethylenemalonate using cyclic isopropylidenyl N-[6-(2-ethyl-4-pyridyl)-2-pyridyl]aminomethylenemalonate, the latter prepared by reacting 2-amino-6-(2-ethyl-4-pyridyl)pyridine with a mixture of triethyl orthoformate and cyclic isopropylidenyl malonate.

EXAMPLE 79

Cyclic isopropylidenyl N-[1-oxo-6-(3-ethyl-1-oxo-4-pyridyl)-2-pyridyl]aminomethylenemalonate using cyclic isopropylidenyl N-[6-(3-ethyl-4-pyridyl)-2-pyridyl]aminomethylenemalonate, the latter prepared by reacting 2-amino-6-(3-ethyl-4-pyridyl(pyridine with a mixture of triethyl orthoformate and cyclic isopropylidenyl malonate.

EXAMPLE 80

Cyclic isopropylidenyl N-[1-oxo-6-(2,6-dimethyl-1-oxo-4-pyridyl)-2-pyridyl]aminomethylenemalonate using cyclic isopropylidenyl N-[6-(2,6-dimethyl-4-pyridyl)-2-pyridyl]aminomethylenemalonate, the latter prepared by reacting 2-amino-6-(2,6-dimethyl-4-pyridyl)pyridine with a mixture of triethyl orthoformate and cyclic isopropylidenyl malonate.

EXAMPLE 81

Cyclic isopropylidenyl N-[1-oxo-6-(3,5-dimethyl-1-oxo-4-pyridyl)-2-pyridyl]aminomethylene-malonate using cyclic isopropylidenyl N-[6-(3,5-dimethyl-4-pyridyl)-2-pyridyl]aminomethylenemalonate, the latter prepared by reacting 2-amino-6-(3,5-dimethyl-4-pyridyl) pyridine with a mixture of triethyl orthoformate and cyclic isopropylidenyl malonate.

Following the procedure described in Example 65 but using in place of cyclic isopropylidenyl N-(6-methyl-1-oxo-2-pyridyl)aminomethylenemalonate a molar equivalent quantity of the appropriate cyclic alkylidenyl N-(6-Q-1-oxo-2-pyridyl)aminomethylenemalonate, the compounds of Examples 82–97 are obtained:

EXAMPLE 82

7-Ethyl-1,4-dihydro-4-oxo-1,8-naphthyridine-8-oxide using cyclic isopropylidenyl N-(6-ethyl-1-oxo-2-pyridyl)aminomethylenemalonate.

EXAMPLE 83

1,4-Dihydro-4-oxo-7-n-propyl-1,8-naphthyridine-8-oxide using cyclic isopropylidenyl N-(1-oxo-6-n-propyl-2-pyridyl)aminomethylenemalonate.

EXAMPLE 84

1,4-Dihydro-7-isopropyl-4-oxo-1,8-naphthyridine-8-oxide using cyclic isopropylidenyl N-(6-isopropyl-1-oxo-2-pyridyl)aminomethylenemalonate.

EXAMPLE 85

7-n-Butyl-1,4-dihydro-4-oxo-1,8-naphthyridine-8-oxide using cyclic isopropylidenyl N-(6-n-butyl-1-oxo-2-pyridyl)aminomethylenemalonate.

EXAMPLE 86

7-n-Hexyl-1,4-dihydro-4-oxo-1,8-naphthyridine-8-oxide using cyclic isopropylidenyl N-(6-n-hexyl-1-oxo-2-pyridyl)aminomethylenemalonate.

EXAMPLE 87

1,4-Dihydro-7-methyl-4-oxo-1,8-naphthyridine-8-oxide using cyclic 3-pentylidenyl N-(6-methyl-1-oxo-2-pyridyl)aminomethylenemaonate.

EXAMPLE 88

1,4-Dihydro-7-methyl-4-oxo-1,8-naphthyridine-8-oxide using cyclic 2-butylidenyl N-(6-methyl-1-oxo-2-pyridyl)aminomethylenemalonate.

EXAMPLE 89

1,4-Dihydro-7-methyl-4-oxo-1,8-naphthyridine-8-oxide using cyclic 4-heptylidenyl N-(6-methyl-1-oxo-2-pyridyl)aminomethylenemalonate.

EXAMPLE 90

1,4-Dihydro-4-oxo-7-(1-oxo-4-pyridyl)-1,8-naphthyridine-8-oxide using cyclic isopropylidenyl N-[1-oxo-6-(1-oxo-4-pyridyl)-2-pyridyl]aminomethylenemalonate.

EXAMPLE 91

1,4-Dihydro-4-oxo-7-(1-oxo-3-pyridyl)-1,8-naphthyridine-8-oxide using cyclic isopropylidenyl N-[1-oxo-6-(1-oxo-3-pyridyl)-2-pyridyl]aminomethylenemalonate.

EXAMPLE 92

1,4-Dihydro-4-oxo-7-(2-methyl-1-oxo-4-pyridyl)-1,8-naphthyridine-8-oxide using cyclic isopropylidenyl N-[1-oxo-6-(2-methyl-1-oxo-4-pyridyl)-2-pyridyl]aminomethylenemalonate.

EXAMPLE 93

1,4-Dihydro-4-oxo-7-(3-methyl-1-oxo-4-pyridyl)-1,8-naphthyridine-8-oxide using cyclic isopropylidenyl N-[1-oxo-6-(3-methyl-1-oxo-4-pyridyl)-2-pyridyl]aminomethylenemalonate.

EXAMPLE 94

1,4-Dihydro-4-oxo-7-(2-ethyl-1-oxo-4-pyridyl)-1,8-naphthyridine-8-oxide using cyclic isopropylidenyl N-[1-oxo-6-(2-ethyl-1-oxo-4-pyridyl)-2-pyridyl]aminomethylenemalonate.

EXAMPLE 95

1,4-Dihydro-4-oxo-7-(3-ethyl-1-oxo-4-pyridyl)-1,8-naphthyridine-8-oxide using cyclic isopropylidenyl N-[1-oxo-6-(3-ethyl-1-oxo-4-pyridyl)-2-pyridyl]aminomethylenemalonate.

EXAMPLE 96

1,4-Dihydro-4-oxo-7-(2,6-dimethyl-1-oxo-4-pyridyl)-1,8-naphthyridine-8-oxide using cyclic isopropylidenyl N-[1-oxo-6-(2,6-dimethyl-1-oxo-4-pyridyl)-2-pyridyl]aminomethylenemalonate.

EXAMPLE 97

1,4-Dihydro-4-oxo-7-(3,5-dimethyl-1-oxo-4-pyridyl)-1,8-naphthyridine-8-oxide using cyclic isopropylidenyl N-[1-oxo-6-(3,5-dimethyl-1-oxo-4-pyridyl)-2-pyridyl]aminomethylenemalonate.

Following the procedure described in Example 66, but using in place of 1,4-dihydro-7-methyl-4-oxo-1,8-naphthyridine-8-oxide a molar equivalent quantity of the appropriate 1,4-dihydro-7-Q-4-oxo-1,8-naphthyridine-8-oxide, the compounds of Examples 98–110 are produced:

EXAMPLE 98

7-Ethyl-1,4-dihydro-4-oxo-1,8-naphthyridine using 7-ethyl-1,4-dihydro-4-oxo-1,8-naphthyridine-8-oxide.

EXAMPLE 99

1,4-Dihydro-4-oxo-7-n-propyl-1,8-naphthyridine using 1,4-dihydro-4-oxo-7-n-propyl-1,8-naphthyridine-8-oxide.

EXAMPLE 100

1,4-Dihydro-7-isopropyl-4-oxo-1,8-naphthyridine using 1,4-dihydro-7-isopropyl-4-oxo-1,8-naphthyridine-8-oxide.

EXAMPLE 101

7-n-Butyl-1,4-dihydro-4-oxo-1,8-naphthyridine using 7-n-butyl-1,4-dihydro-4-oxo-1,8-naphthyridine-8-oxide.

EXAMPLE 102

7-n-Hexyl-1,4-dihydro-4-oxo-1,8-naphthyridine using 7-n-hexyl-1,4-dihydro-4-oxo-1,8-naphthyridine-8-oxide.

EXAMPLE 103

1,4-Dihydro-4-oxo-7-(4-pyridyl)-1,8-naphthyridine using 1,4-dihydro-4-oxo-7-(1-oxo-4-pyridyl)-1,8-naphthyridine-8-oxide.

EXAMPLE 104

1,4-Dihydro-4-oxo-7-(3-pyridyl)-1,8-naphthyridine using 1,4-dihydro-4-oxo-7-(1-oxo-3-pyridyl)-1,8-naphthyridine-8-oxide.

EXAMPLE 105

1,4-Dihydro-4-oxo-7-(2-methyl-4-pyridyl)-1,8-naphthyridine using 1,4-dihydro-4-oxo-7-(2-methyl-1-oxo-4-pyridyl)-1,8-naphthyridine-8-oxide.

EXAMPLE 106

1,4-Dihydro-4-oxo-7-(3-methyl-4-pyridyl)-1,8-naphthyridine using 1,4-dihydro-4-oxo-7-(3-methyl-1-oxo-4-pyridyl)-1,8-naphthyridine-8-oxide.

EXAMPLE 107

1,4-Dihydro-4-oxo-7-(2-ethyl-4-pyridyl)-1,8-naphthyridine using 1,4-dihydro-4-oxo-7-(2-ethyl-1-oxo-4-pyridyl)-1,8-naphthyridine-8-oxide.

EXAMPLE 108

1,4-Dihydro-4-oxo-7-(3-ethyl-4-pyridyl)-1,8-naphthyridine using 1,4-dihydro-4-oxo-7-(3-ethyl-1-oxo-4-pyridyl)-1,8-naphthyridine-8-oxide.

EXAMPLE 109

1,4-Dihydro-4-oxo-7-(2,6-dimethyl-4-pyridyl)-1,8-naphthyridine using 1,4-dihydro-4-oxo-7-(2,6-dimethyl-1-oxo-4-pyridyl)-1,8-naphthyridine-8-oxide.

EXAMPLE 110

1,4-Dihydro-4-oxo-7-(3,5-dimethyl-4-pyridyl)-1,8-naphthyridine using 1,4-dihydro-4-oxo-7-(3,5-dimethyl-1-oxo-4-pyridyl)-1,8-naphthyridine-8-oxide.

Preferred process and composition embodiments of the invention in addition to those noted hereinabove, e.g., those where Q is 4(or 3)-pyridyl, 2-methyl-4-pyridyl or 2,6-dimethyl-4-pyridyl, are those where Q is methyl and where $R_1$ is ethyl.

We claim:

1. A compound selected from 1,4-dihydro-4-oxo-7-Q-1,8-naphthyridine-3-carbonaldehyde and its tautomeric 4-hydroxy-7-Q-1,8-naphthyridine-3-carboxaldehyde, where Q is lower-alkyl, lower-alkanoyloxymethyl, 4(or 3)-pyridyl or 4(or 3)-pyridyl having one or two lower-alkyl substituents.

2. The compound according to claim 1 wherein Q is methyl.

3. 1-(Lower-alkyl)-1,4-dihydro-4-oxo-7-Q-1,8-naphthyridine-3-carboxaldehyde where Q is lower-alkyl, loweralkanoyloxymethyl, 4(or 3)-pyridyl or 4(or 3)-pyridyl having one or two lower-alkyl substituents.

4. The compound according to claim 3 where Q is methyl.

* * * * *

UNITED STATES PATENT OFFICE
CERTIFICATE OF CORRECTION

PATENT NO. : 3,857,851
DATED : December 31, 1974
INVENTOR(S) : George Y. Lesher and Monte D. Gruett It is certified that error appears in the above-identified patent and that said Letters Patent are hereby corrected as shown below:

Column 1, line 59, "AS" should read -- as --.

Column 2, line 67, "having ore" should read -- having one --.

Column 18, line 5, "3-carbonaldehyde" should read -- 3-carboxaldehyde --.

Column 18, line 14, "loweralkanoyloxymethyl" should read -- lower-alkanoyloxymethyl --.

Signed and sealed this 27th day of May 1975.

(SEAL)
Attest:

RUTH C. MASON
Attesting Officer

C. MARSHALL DANN
Commissioner of Patents
and Trademarks